US012435674B2

(12) United States Patent
Des Roches-Dionne et al.

(10) Patent No.: US 12,435,674 B2
(45) Date of Patent: Oct. 7, 2025

(54) SYSTEM AND METHOD FOR OPERATING A TURBOPROP ENGINE

(71) Applicant: PRATT & WHITNEY CANADA CORP., Longueuil (CA)

(72) Inventors: Nicolas Des Roches-Dionne, Longueuil (CA); Sylvain Lamarre, Boucherville (CA); Alexandre Charest, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1159 days.

(21) Appl. No.: 16/551,177

(22) Filed: Aug. 26, 2019

(65) Prior Publication Data
US 2021/0025338 A1 Jan. 28, 2021

Related U.S. Application Data

(60) Provisional application No. 62/879,066, filed on Jul. 26, 2019.

(51) Int. Cl.
*B64D 31/06* (2024.01)
*B64D 27/10* (2006.01)
(Continued)

(52) U.S. Cl.
CPC .............. *F02C 9/28* (2013.01); *B64D 31/06* (2013.01); *F02C 9/44* (2013.01);
(Continued)

(58) Field of Classification Search
CPC ...... F02C 9/58; F02C 9/28; F02C 9/44; B64D 31/06; B64D 27/10; B64C 11/305;
(Continued)

(56) References Cited

U.S. PATENT DOCUMENTS 4,432,201 A * 2/1984 Hawes ............... F02C 9/28
60/792
4,625,510 A * 12/1986 Evans ............... F02C 9/28
60/39.282

(Continued)

FOREIGN PATENT DOCUMENTS

| EP | 3147220 | 3/2017 |
| EP | 3276148 | 1/2018 |
| EP | 3366590 | 8/2018 |

OTHER PUBLICATIONS

Jet.Careers.com https://jetcareers.com/forums/threads/turboprop-control-levers.52477/ (Year: 2007).*
Airliners.net https://www.airliners.net/forum/viewtopic.php?t=757647 (Year: 2008).*
Extended European Search Report issued on Jan. 12, 2021, in counterpart EP application.

*Primary Examiner* — Devon C Kramer
*Assistant Examiner* — Roberto Toshiharu Igue
(74) *Attorney, Agent, or Firm* — NORTON ROSE FULBRIGHT CANADA LLP (57) ABSTRACT

There is provided a method and system for operating a turboprop engine of an aircraft. When a resulting value for Ng is between at least one upper limit and at least one lower limit, the output power is governed as a function of the target power. When the resulting value for Ng is on or outside of the at least one upper limit and the at least one lower limit, the output power is governed as a function of the maximum Ng and the minimum Ng.

20 Claims, 8 Drawing Sheets

(51) Int. Cl.
    *F02C 9/28*    (2006.01)
    *B64C 11/30*   (2006.01)
    *F02C 9/44*    (2006.01)
    *F02C 9/58*    (2006.01)

(52) U.S. Cl.
    CPC .. *F05B 2270/1031* (2013.01); *F05D 2270/02* (2013.01); *F05D 2270/051* (2013.01); *F05D 2270/052* (2013.01); *F05D 2270/304* (2013.01); *F05D 2270/335* (2013.01)

(58) Field of Classification Search
    CPC ....... F05B 2270/1031; F05D 2220/323; F05D 2270/02; F05D 2270/051; F05D 2270/052; F05D 2270/304; F05D 2270/335; F05D 2270/053; Y02T 50/60
    See application file for complete search history.

(56) References Cited

U.S. PATENT DOCUMENTS

| | | | |
|---|---|---|---|
| 4,958,289 A * | 9/1990 | Sum | F02C 9/58 701/99 |
| 9,494,085 B2 | 11/2016 | Cai | |
| 2007/0110577 A1* | 5/2007 | Danielson | B64C 11/303 416/1 |
| 2013/0199204 A1* | 8/2013 | Camhi | G05B 23/0221 60/779 |
| 2019/0186284 A1* | 6/2019 | Orkiszewski | F01D 25/34 |
| 2020/0271011 A1* | 8/2020 | Comandore | F01D 21/00 |

* cited by examiner

SYSTEM AND METHOD FOR OPERATING A TURBOPROP ENGINE

CROSS-REFERENCE TO RELATED APPLICATIONS

The present application claims priority of U.S. Provisional Patent Application No. 62/879,066 filed on Jul. 26, 2019, the contents of which are hereby incorporated by reference in their entirety.

TECHNICAL FIELD

The present disclosure relates generally to gas turbine engines, and more particularly to power governing for turboprop engines.

BACKGROUND OF THE ART

Turboprop engines are used for many single, twin and commuter aircraft. Thrust is produced indirectly as a compressor and turbine assembly furnishes torque to a propeller, producing a large portion of the propulsive force that drives the aircraft.

During forward propeller operation, a typical power governing loop on a turboprop engine receives a power lever position from the cockpit and sets the gas generator speed (Ng) in order to achieve a target output power associated with the power lever position. Ng is modified in a closed loop until the target output power is reached.

Power governing at low power can be challenging. Therefore, improvements are needed.

SUMMARY

In accordance with a broad aspect, there is provided a method for operating a turboprop engine of an aircraft. The method comprises obtaining at least one upper limit and at least one lower limit on a gas generator speed (Ng) of the turboprop engine, the at least one upper limit defined by a maximum Ng as a function of a power lever position of the aircraft and the at least one lower limit defined by a minimum Ng as a function of the power lever position. A target power for the turboprop engine is received and in response, the output power for the turboprop engine is governed. When a resulting value for Ng is between the at least one upper limit and the at least one lower limit, the output power is governed as a function of the target power. When the resulting value for Ng is on or outside of the at least one upper limit and the at least one lower limit, the output power is governed as a function of the maximum Ng and the minimum Ng.

In accordance with another broad aspect, there is provided a system for operating a turboprop engine of an aircraft. The system comprises a processing unit and a non-transitory computer readable medium having stored thereon program instructions. The program instructions are executable by the processing unit for obtaining at least one upper limit and at least one lower limit on a gas generator speed (Ng) of the turboprop engine, the at least one upper limit defined by a maximum Ng as a function of a power lever position of the aircraft and the at least one lower limit defined by a minimum Ng as a function of the power lever position. The program instructions are executable by the processing unit for receiving a target power for the turboprop engine and in response, governing the output power for the turboprop engine. When a resulting value for Ng is between the at least one upper limit and the at least one lower limit, the output power is governed as a function of the target power. When the resulting value for Ng is on or outside of the at least one upper limit and the at least one lower limit, the output power is governed as a function of the maximum Ng and the minimum Ng.

Features of the systems, devices, and methods described herein may be used in various combinations, in accordance with the embodiments described herein.

BRIEF DESCRIPTION OF THE DRAWINGS

Reference is now made to the accompanying Figs. in which.

It will be noted that throughout the appended drawings, like features are identified by like reference numerals.

DETAILED DESCRIPTION

Figure 1:
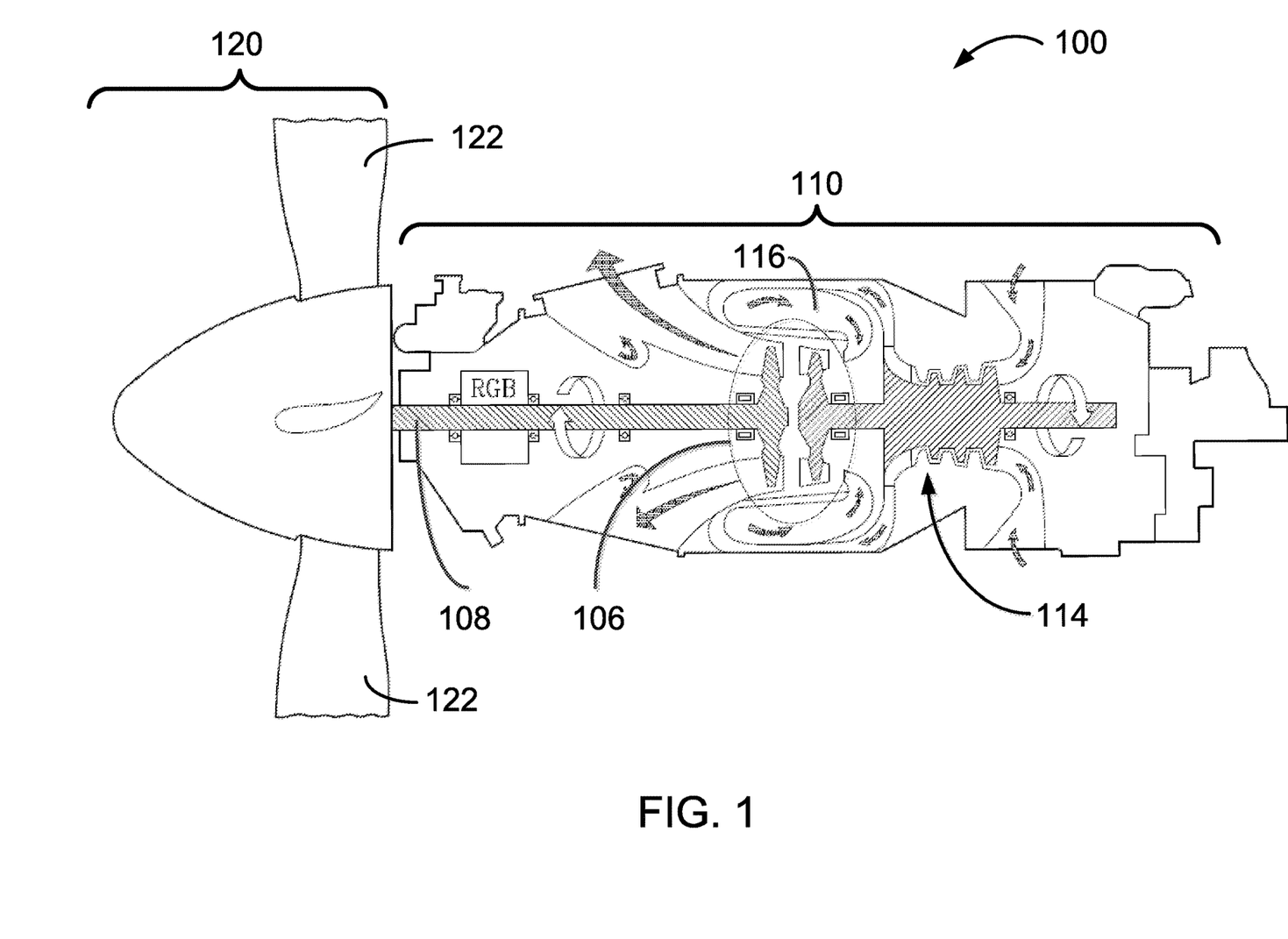
FIG. 1 is a schematic diagram of an example turboprop engine, in accordance with an illustrative embodiment.

FIG. 1 illustrates an aircraft powerplant 100 for an aircraft of a type provided for use in subsonic flight, generally comprising an engine 110 and a propeller 120. The powerplant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force for the aircraft, also known as thrust. The propeller 120 comprises two or more propeller blades 122. A blade angle of the propeller blades 122 may be adjusted. The blade angle may be referred to as a beta angle, an angle of attack or a blade pitch. The powerplant 100 may be implemented to comprise a single or multi-spool gas turbine engine, where the turbine section 106 is connected to the propeller 120 through a reduction gearbox (RGB).

Figure 2:
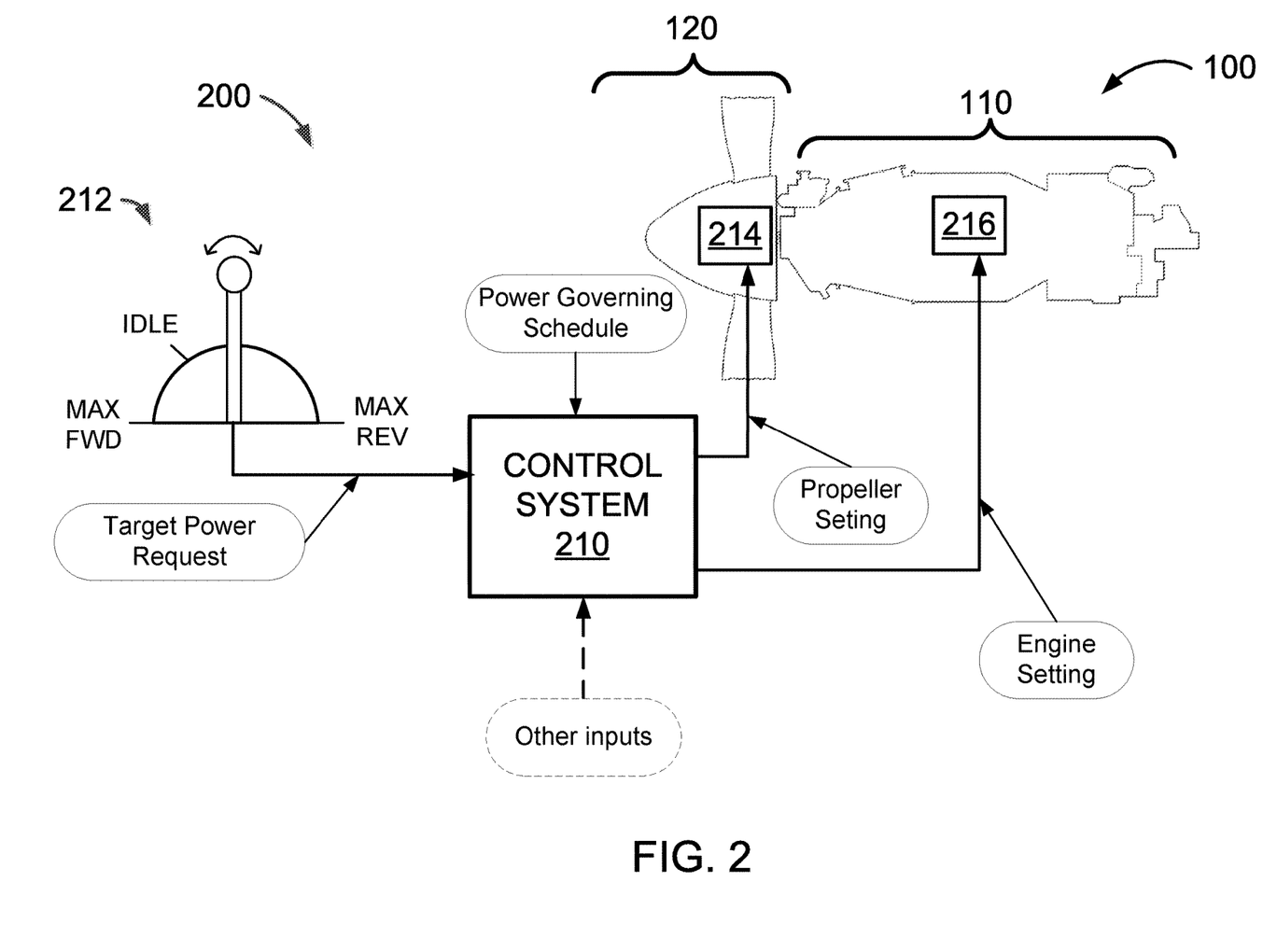
FIG. 2 is a schematic diagram illustrating a control system for controlling operation of the turboprop engine of FIG. 1, in accordance with an illustrative embodiment.

With reference to FIG. 2, there is illustrated a system 200 for operating the powerplant 100 within an aircraft. A control system 210 receives a target power request from a lever 212 of the aircraft under control by a pilot or other operator, which may be a power lever, a thrust lever, and/or a throttle. The target power request may be received at the control system 210 from another system that receives an input from the lever 212 and translates the input into the target power request. In some embodiments, two or more levers may provide input, directly or indirectly, to the control system 210.

Several lever positions can be selected, for example those for (1) maximum forward thrust (MAX FWD), which is typically used during takeoff; (2) idle (IDLE), which may be used in flight during approach, during taxiing on the ground, or on the ground when the propeller 120 is spinning, but providing very low thrust; and (3) maximum reverse thrust (MAX REV), which is typically used at landing in order to slow the aircraft. Intermediate positions between the above-mentioned positions can also be selected.

For the purposes of the present disclosure, the expression "idle" is used to refer to an operating regime of an engine whereby the engine is still active but providing minimal power. Various idle levels may be provided, such as flight idle and ground idle. In some embodiments, additional idle positions are also provided, such as anti-ice idle, cabin heating idle, and the like. These idle positions represent different engine power levels. In some embodiments, other lever positions than the ones illustrated are provided.

The control system 210 receives a power governing schedule, used to set the engine output power in response to receiving the power request. The power governing schedule sets out fuel flow to achieve a power target as a function of the PLA position and ambient conditions.

The control system 210 may receive additional inputs pertaining to the operation of the propeller 120, engine 110 and/or the aircraft. In some embodiments, the control system 210 receives an on-ground status indicative of whether the aircraft is on-ground or in-flight. The additional inputs may vary depending on practical implementations.

In general, the control system 210 is configured to control the engine 110 and the propeller 120 based on the received inputs. The control system 210 controls the engine 110 by outputting an engine setting to an engine actuator 216 for adjusting engine fuel flow in accordance with the target power request as received and the current settings of the engine 110. The control system 210 controls the blade angle of the propeller 120 via a propeller actuator 214 in order to achieve a propeller speed in accordance with a speed setting. The engine actuator 216 and/or propeller actuator 214 may each be implemented as a torque motor, a stepper motor or any other suitable actuator. The propeller actuator 214 can control hydraulic oil pressure to adjust the blade angle based on a propeller setting. The engine actuator 216 can adjust the fuel flow to the engine 110 based on the engine setting. Although the control system 210 is illustrated as separate from the powerplant 100, it may also be integrated therewith.

Figure 3:
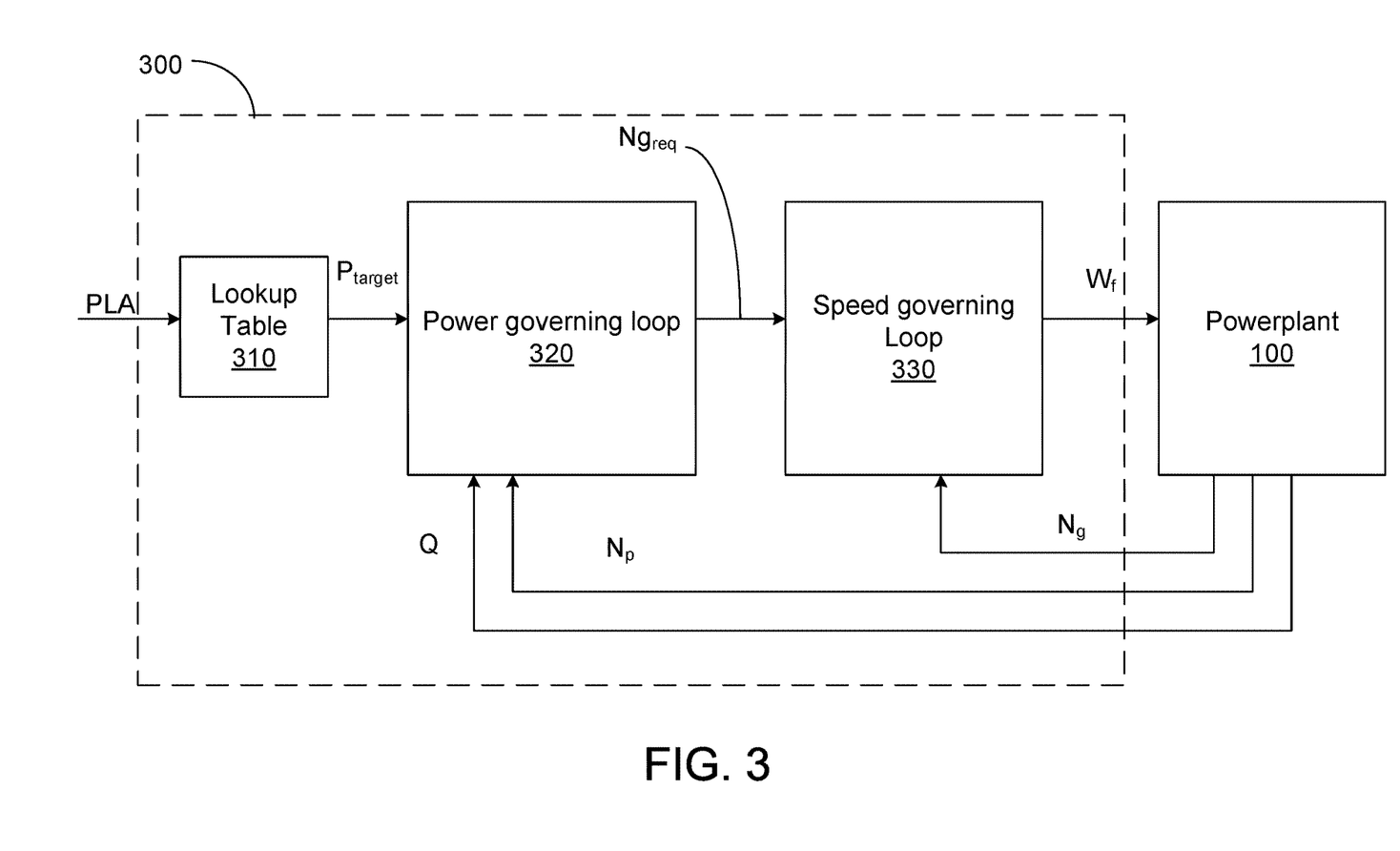
FIG. 3 is a block diagram of an example control scheme performed by the control system of FIG. 2, in accordance with an illustrative embodiment.

Referring to FIG. 3, there is illustrated a simplified block diagram of an example control scheme 300 for controlling output power of powerplant 100. The output power is controlled through fuel flow regulation. Control scheme 300 includes a lookup table 310, a power governing loop 320, and a speed governing loop 330. The power governing loop 320 may be referred to as an outer control loop, the speed governing loop 330 may be referred to as an inner control loop.

As depicted in FIG. 3, lookup table 310 is operable to receive a power lever angle (PLA) signal, for example from the lever 212, and determine a corresponding target power ($P_{target}$). In some embodiments, lookup table 310 is a multi-dimensional lookup table taking into account a plurality of factors to select $P_{target}$.

Power governing loop 320 is operable to accept as inputs the target power $P_{target}$, as well as signals representative of output torque (Q), and propeller speed (Np). Using these inputs, the power governing loop 320 is configured to determine a requested gas generator speed ($Ng_{req}$). It will be understood that torque Q may be obtained using various techniques. For example, torque may be determined using a phase shift torque measurement, or using a pressure transducer which measures a differential pressure across the reduction gearbox. Other techniques may also be used.

Speed governing loop 330 is operable to accept the requested gas generator speed $Ng_{req}$ from the power governing loop 320, as well as the actual gas generator speed Ng from the powerplant 100. The speed governing loop 330 is configured to determine a fuel flow command $W_f$ to control engine speed Ng. In some embodiments, the fuel flow command $W_f$ is sent to a fuel control unit.

The power governing loop 320 refers to the power governing schedule, as received by the control system 210, in order to determine the requested gas generator speed $Ng_{req}$. The power governing schedule sets out at least one upper limit and at least one lower limit for the gas generator speed Ng of the engine 110. The upper limit defines a maximum speed at which the gas generator can rotate as a function of power lever position, the lower limit defines a minimum speed at which the gas generator can rotate as a function of power lever position. Outside of these limits, Ng has authority over the power governing loop 320. Inside of these limits, $P_{target}$ has authority over the power governing loop 320. In other words, if the requested gas generator speed $Ng_{req}$ falls within the upper and lower limits for Ng, the power governing loop 320 is configured to govern output power for the engine 110 as a function of the target power $P_{target}$. In this scenario, the control scheme 300 will operate in a closed loop in order to achieve the target power associated with the position of the lever 212. The authority on the power governing loop 320 will thus be the target power $P_{target}$. If the requested gas generator speed $Ng_{req}$ falls on or outside of the upper and lower limits for Ng, the power governing loop 320 is configured to govern output power for the engine 110 as a function of the maximum and minimum limits on the rotational speed of the gas generator. In this scenario, the control scheme 300 will set the value for $Ng_{req}$ to the maximum or minimum Ng value of the power governing schedule, depending on whether the requested gas generator speed $Ng_{req}$ is above the upper limit or below the lower limit for Ng. The authority on the power governing loop 320 will thus be Ng.

Figure 4:
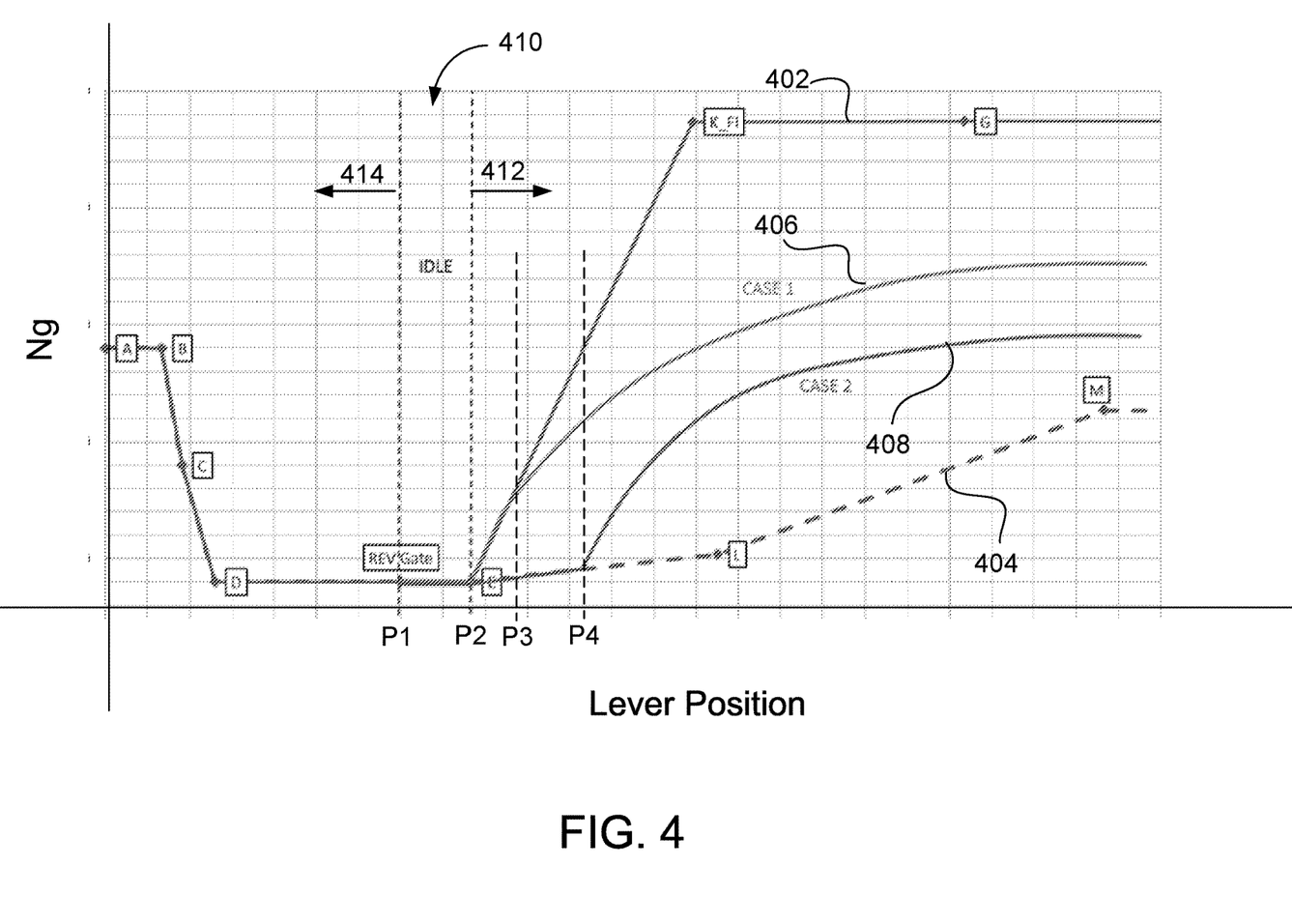
FIG. 4 is a graph of an example power governing schedule, in accordance with an illustrative embodiment.

An example of a power governing schedule is provided in FIG. 4. An upper limit 402 and a lower limit 404 for Ng are illustrated with respect to a power lever position. The upper and lower limits 402, 404 converge towards an idle operating regime of the engine, represented by region 410 on the graph, which occurs when the power lever is in an idle position. Lever positions between points P1 and P2 are for operating the engine in the idle operating regime. Lever positions in direction 414 are for reverse operation of the propeller, lever positions in direction 412 are for forward operation of the propeller.

In this example, the upper and lower limits 402, 404 overlap in the idle region 410 and represent a same value. Starting from point P2, which may be at or near the idle region 410, the upper and lower limits 402, 404 diverge. The gradual divergence of the upper and lower limits 402, 404 from the idle region 410 into a forward operating region allows a smooth transition into the power governing loop as a function of $P_{target}$, and a progressive transition into and out of the idle operating regime. When the power governing loop 320 governs as a function of the maximum and minimum Ng, the power variations and oscillations that can sometimes result at low power levels are reduced.

Curves 406 and 408 illustrate two example cases of $Ng_{req}$ set as a function of $P_{target}$, where $P_{target}$ is determined as a function of the lever position. Curve 406 represents an example $Ng_{req}$ for a first set of ambient conditions, such as but not limited to outside pressure, outside temperature, aircraft speed, and the like. In this example, $Ng_{req}$ of curve 406 is set to the maximum speed at which the gas generator can rotate ($Ng_{max}$) between points P1 and P3, defined by the upper limit 402. Beyond point P3, $Ng_{req}$ of curve 406 is set to an Ng value that will generate an output power equal to the requested target power. When $Ng_{req}$ is set to $Ng_{max}$, the output power of the engine will be lower than the requested target power.

Curve 408 represents an example $Ng_{req}$ for a second set of ambient conditions. In this example, $Ng_{req}$ of curve 408 is set to the minimum speed at which the gas generator can rotate ($Ng_{min}$) between points P2 and P4, defined by the lower limit 404. Beyond point P4, $Ng_{req}$ of curve 408 is set to an Ng value that will generate an output power equal to the requested target power. When $Ng_{req}$ is set to $Ng_{min}$, the output power of the engine will be higher than the requested target power.

In some embodiments, two distinct sets of power governing schedules are used for ground operation and flight operation. This allows the power governing schedule of ground and flight operation to be independent of each other, which allows each schedule to be optimized independently of the other schedule. A higher range of power lever movement may be used for power modulation, providing more power granularity and aircraft speed control. The separate schedules also simplify operation of the lever in the aircraft as no distinction needs to be made between ground and flight operation on the lever positions, as illustrated in the example of FIG. 2. The two power governing schedules may differ in terms of upper limit, lower limit, point of convergence of the upper and lower limits, etc. In some embodiments, the power governing schedule of FIG. 4 is for flight operation and a separate power governing schedule is provided for ground operation.

Figure 5:
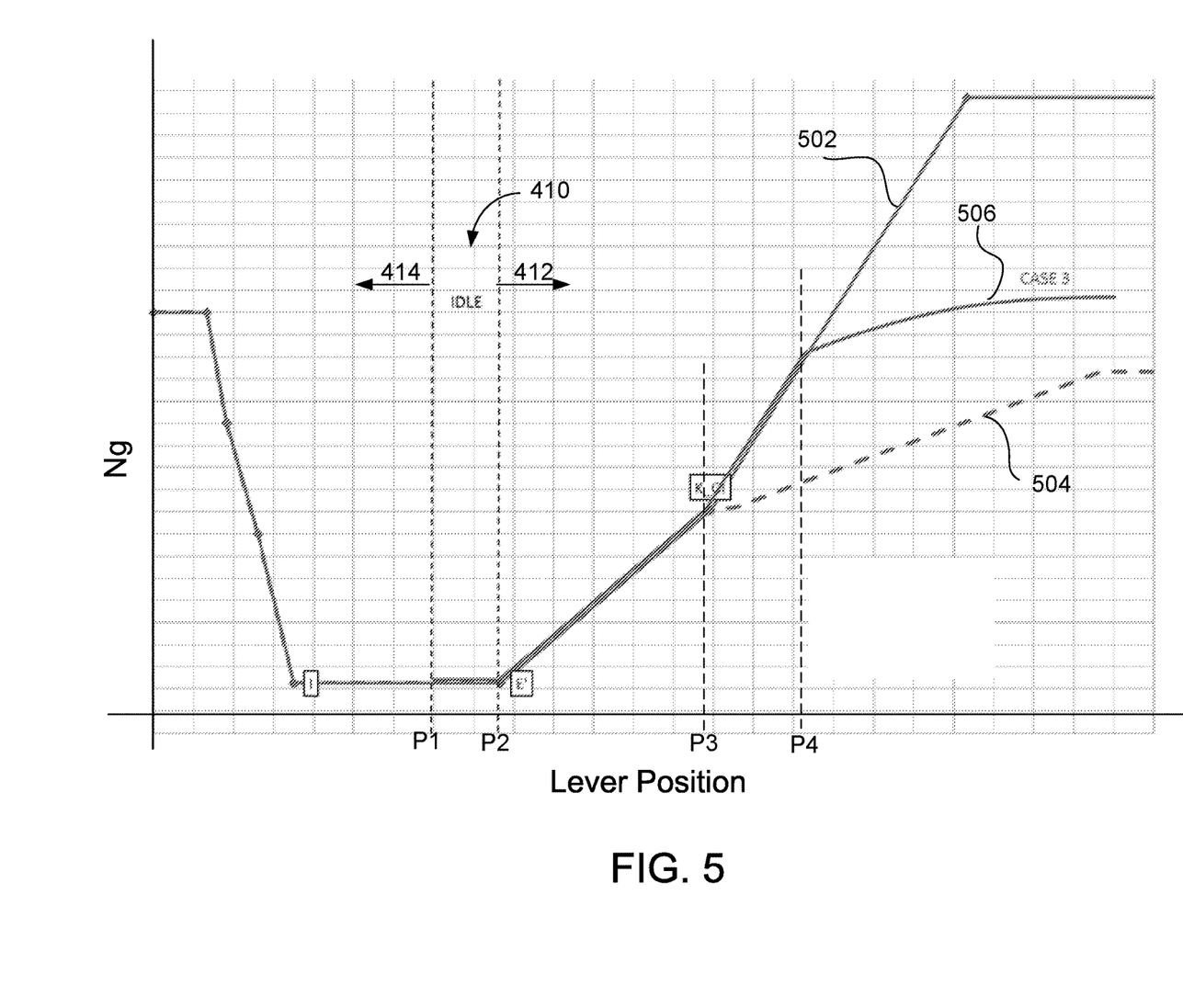
FIG. 5 is a graph of another example power governing schedule, in accordance with an illustrative embodiment.

Referring to FIG. 5, there is illustrated an example of a power governing schedule for ground operation. An upper Ng limit 502 and a lower Ng limit 504 define the region inside which the power governing loop 320 governs as a function of $P_{target}$. Outside of the upper and lower limits 502, 504, the power governing loop 320 governs as a function of Ng. Curve 506 illustrates an example case of $Ng_{req}$. From points P1 to P4, $Ng_{req}$ is set to the value of the upper limit 502, i.e. $Ng_{max}$. The output power will therefore be lower than the target power as requested. Beyond point P4, $Ng_{req}$ is set to a value that will result in the target power as requested.

Figure 6:
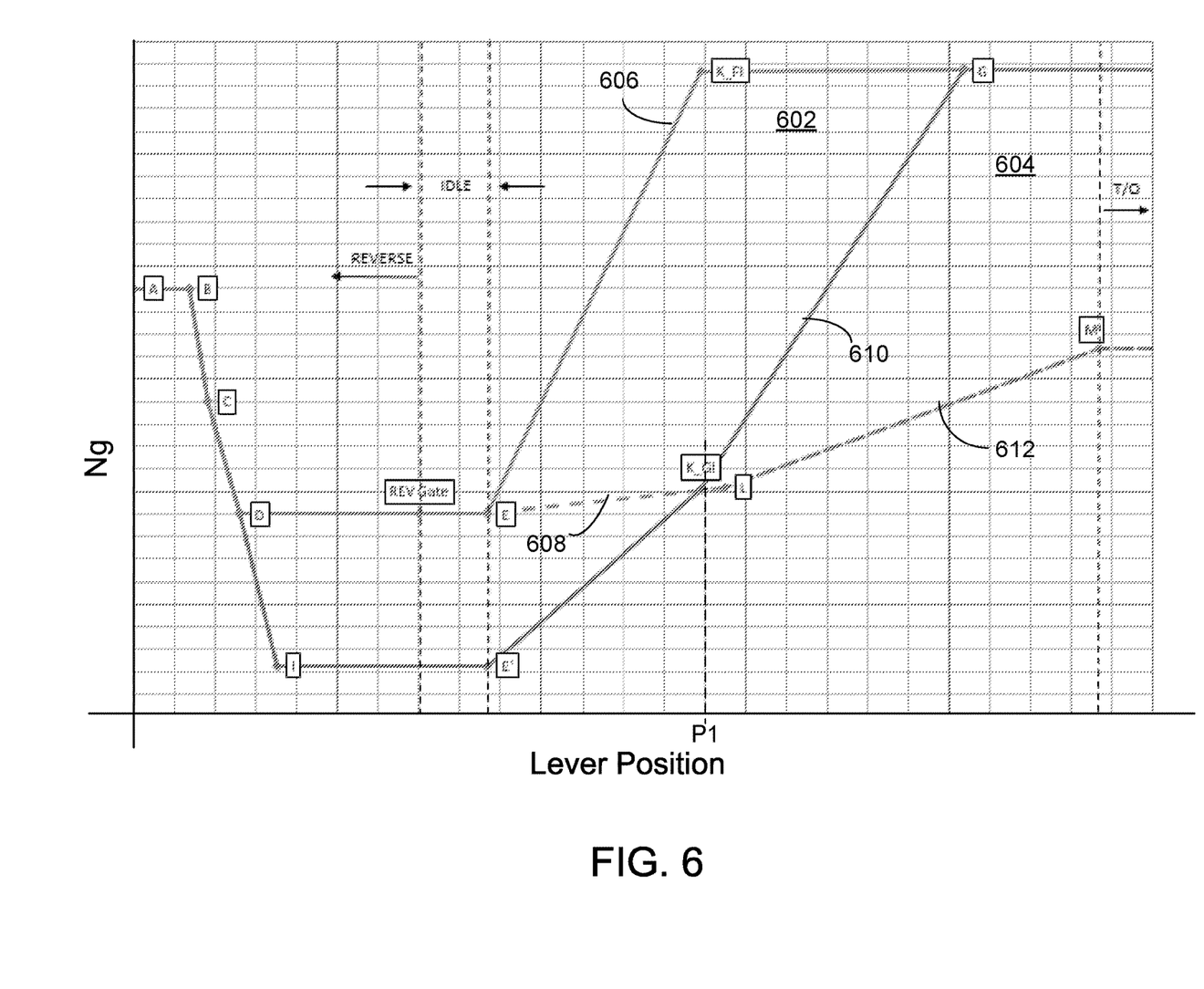
FIG. 6 is a graph of an example power governing schedule having limits for flight and ground operation, in accordance with an illustrative embodiment.

FIG. 6 illustrates a power governing schedule for flight operation and ground operation together. In this example, the ground schedule 604 is fully encompassed within the flight schedule 602. The flight schedule 602 is defined by an upper limit 606 and a lower limit 608. The ground schedule 604 is defined by an upper limit 610 and a lower limit 612. Beyond point P1, the lower limit 608 of the flight schedule 602 overlaps with the lower limit 612 of the ground schedule 604. In other embodiments, the flight schedule 602 and the ground schedule 604 do not overlap.

In some embodiments, at take-off, the lower limit 608, 612 is designed to ensure a percentage of the take-off power in case of an undetected loss of torque.

It will be understood that the power governing schedules illustrated in FIGS. 4-6 are illustrative only. The upper and lower limits, points of convergence, and other parameters may vary in accordance with practical implementations.

In some embodiments, the control system 212 is configured to switch between the ground schedule 604 and the flight schedule 602 using one or more criteria. For example, the appropriate schedule 602, 604 may be selected using an on-ground status. In some embodiments, the on-ground status is obtained using a weight-on-wheels input. Other inputs, such as aircraft altitude, aircraft speed, and geo-localisation may also be used to determine the on-ground status. In some embodiments, the on-ground status is used in combination with a timer, for example a switch between the ground schedule 604 and the flight schedule 602 occurs when the on-ground status changes and stays at its new status for a number of seconds. The timer criteria allows the pilot to transition to reverse propeller operation within a certain time, leveraging the available higher engine power. In some embodiments, the on-ground status is used in combination with a lever position, with or without a timer. For example, a switch between the ground schedule 604 and the flight schedule 602 occurs when the on-ground status changes and the lever transitions from reverse to idle. This causes a reduction in power when transitioning back to forward mode to reduce forward thrust following the reverse operation.

Figure 7:
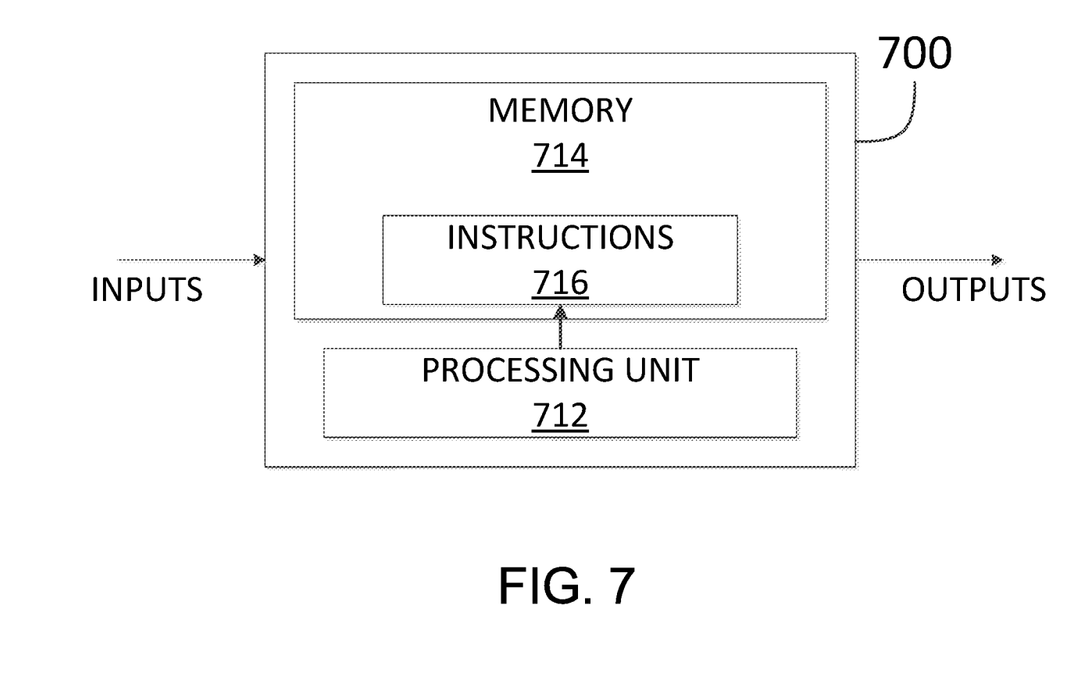
FIG. 7 is a block diagram of a computing device for implementing the system of FIG. 2, in accordance with an illustrative embodiment.

With reference to FIG. 7, an example of a computing device 700 is illustrated. The control system 210 may be implemented with one or more computing devices 700. For example, each of one a propeller controller and an engine controller may be implemented by a separate computing device 700. The computing device 700 comprises a processing unit 712 and a memory 714 which has stored therein computer-executable instructions 716. The processing unit 712 may comprise any suitable devices configured to implement a method such that instructions 716, when executed by the computing device 700 or other programmable apparatus, may cause the functions/acts/steps to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to the computing device 700, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means suitable for retrievably storing machine-readable instructions 716 executable by processing unit 712.

Note that the computing device 700 can be implemented as part of a full-authority digital engine controls (FADEC) or other similar device, including electronic engine control (EEC), engine control unit (EUC), electronic propeller control, (EPC) propeller control unit, and the like.

Figure 8:
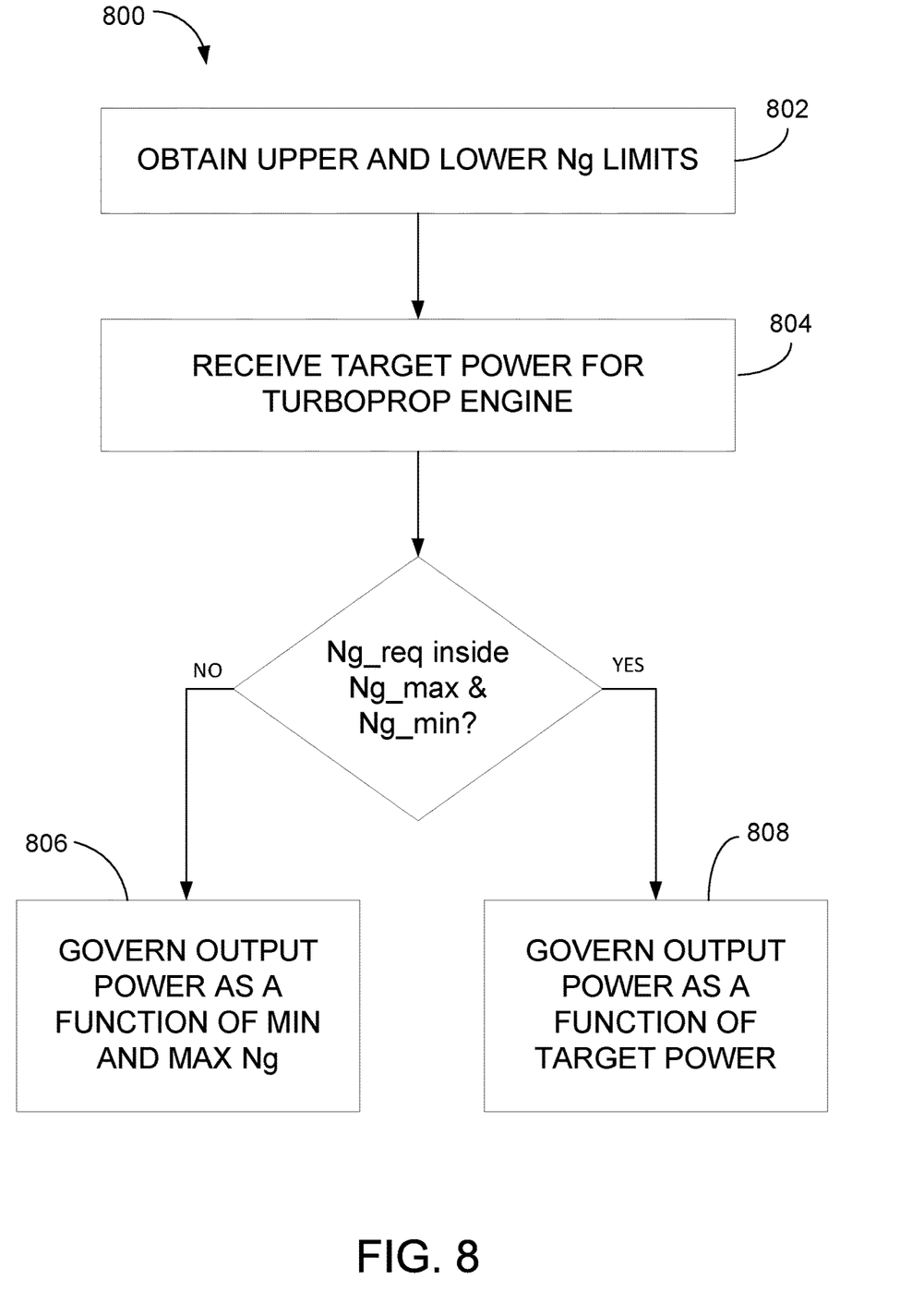
FIG. 8 is a flowchart of an example method for operating a turboprop engine, in accordance with an illustrative embodiment.

Referring to FIG. 8, there is illustrated a flowchart of an example method 800 for operating a turboprop engine of an aircraft, such as engine 110 coupled to propeller 120. At 802, the upper and lower Ng limits are obtained. More specifically, at least one upper limit and at least one lower limit on the gas generator speed of the turboprop engine is obtained. The upper limit(s) are defined by a maximum Ng as a function of power lever position and the lower limit(s) are defined by a minimum Ng as a function of a power lever position. The upper and lower limits converge towards an idle position of the power lever, where the turboprop engine is operating in an idle regime. In some embodiments, separate upper and lower limits are obtained for flight operation and ground operation of the turboprop engine.

At 804, a target power of the turboprop engine is received. The target power may be received in various forms, such as a lever position, a desired output power, etc. In response to receiving the target power, the method 800 will take one of two possible paths. If the resulting value for Ng, determined as a function of the target power and other factors, is between the upper and lower limits, the output power of the turboprop engine will be governed as a function of the target power, as per 808. If the resulting value for Ng is on or outside of the upper and lower limits, the output power of the turboprop engine will be governed as a function of Ng, and more particularly $Ng_{max}$ and $Ng_{min}$, as per 806. If the resulting value for Ng is above the upper limit, Ng will be set to $Ng_{max}$ as defined by the upper limit. If the resulting value for Ng is below the lower limit, Ng will be set to $Ng_{min}$ as defined by the lower limit.

In some embodiments, the method 800 further comprises transitioning between two different sets of upper and lower limits, one set associated with flight operation and one set associated with ground operation of the turboprop engine. One or more criteria may be used to transition between the set of limits, such as but not limited to on-ground status, a timer condition, and/or a position of the power lever of the aircraft. Other criteria may also be used.

The methods and systems described herein may also be applied to turbofan engines. Upper and lower limits may be applied to a gas turbine generator speed (Ng) as a function of a power lever position. When a target thrust or fan speed (N1) is received for the turbofan engine, fan speed is governed as a function of the target when a resulting value for Ng is between the upper and lower limits for Ng. Fan speed is governed as a function of a maximum and minimum Ng when the resulting value for Ng is on or outside of the upper and lower limits for Ng.

The methods and systems for operating a turboprop engine described herein may be implemented in a high level procedural or object oriented programming or scripting language, or a combination thereof, to communicate with or assist in the operation of a computer system, for example the computing device 700. Alternatively, the methods and systems for operating a turboprop engine may be implemented in assembly or machine language. The language may be a compiled or interpreted language. Program code for implementing the methods and systems for operating a turboprop engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a turboprop engine may also be considered to be implemented by way of a non-transitory computer-readable storage medium having a computer program stored thereon. The computer program may comprise computer-readable instructions which cause a computer, or more specifically the processing unit 712 of the computing device 700, to operate in a specific and predefined manner to perform the functions described herein, for example those described in the method 800.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for operating a turboprop engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The above description is meant to be exemplary only. Although particular embodiments have been shown and described, it will be understood by those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for transitioning a turboprop engine of an aircraft out of and into an idle operating regime of the turboprop engine, the method comprising:

obtaining a power governing schedule defining at least one upper gas generator speed (Ng) limit and at least one lower Ng limit of the turboprop engine, the at least one upper Ng limit defining a maximum Ng that varies as a function of a power lever position of the aircraft for producing forward thrust with a propeller of the turboprop engine and beyond an idle power lever position, the at least one lower Ng limit defining a minimum Ng that varies as a function of the power lever position, the at least one upper Ng limit and the at least one lower Ng limit diverging from the idle power lever position to define a progressive transition out of and into the idle operating regime of the turboprop engine;

receiving a target power for the turboprop engine corresponding to a current power lever position, the current power lever position corresponding to forward thrust operation of the propeller of the turboprop engine and being beyond the idle power lever position;

selecting, from the power governing schedule, a maximum Ng corresponding to the current power lever position and a minimum Ng corresponding to the current power lever position; and in response to receiving the target power:
governing output power for the turboprop engine to achieve the target power, governing the output power including determining a requested Ng;
when the requested Ng is between the maximum Ng corresponding to the current power lever position and the minimum Ng corresponding to the current power lever position, using the requested Ng to govern the output power for the turboprop engine;
when the requested Ng is above the maximum Ng corresponding to the current power lever position, using the maximum Ng instead of the requested Ng to govern the output power for the turboprop engine; and
when the requested Ng is below the minimum Ng corresponding to the current power lever position, using the minimum Ng instead of the requested Ng to govern the output power for the turboprop engine.

2. The method of claim 1, wherein:
the at least one upper Ng limit comprises a first upper Ng limit for flight operation and a second upper Ng limit for ground operation, the first upper Ng limit being different from the second upper Ng limit; and
the at least one lower Ng limit comprises a first lower Ng limit for flight operation and a second lower Ng limit for ground operation, the first lower Ng limit being different from the second lower Ng limit.

3. The method of claim 2, wherein the first upper Ng limit and the first lower Ng limit meet at a common value when the power lever position is at idle.

4. The method of claim 2, wherein the first upper Ng limit and the first lower Ng limit overlap when the power lever position is at idle.

5. The method of claim 2, wherein the second upper Ng limit and the second lower Ng limit meet at a common value along the first lower Ng limit.

6. The method of claim 2, wherein the first lower Ng limit and the second lower Ng limit overlap for at least a portion thereof.

7. The method of claim 2, further comprising transitioning between the flight operation and the ground operation based on at least one criteria comprising an on-ground status.

8. The method of claim 7, wherein the at least one criteria comprises the on-ground status and a timer condition.

9. The method of claim 7, wherein the at least one criteria comprises the on-ground status and the power lever position.

10. The method of claim 1, wherein providing the at least one lower Ng limit comprises selecting the minimum Ng to ensure a percentage of take-off power in case of an undetected loss of torque.

11. A system for transitioning a turboprop engine of an aircraft out of and into an idle operating regime of the turboprop engine, the system comprising:
a processing unit; and
a non-transitory computer readable medium having stored thereon program instructions executable by the processing unit for:
obtaining a power governing schedule defining at least one upper gas generator speed (Ng) limit and at least one lower Ng limit of the turboprop engine, the at least one upper Ng limit defining a maximum Ng that varies as a function of a power lever position of the aircraft for producing forward thrust with a propeller of the turboprop engine and beyond an idle power lever position, the at least one lower Ng limit defining a minimum Ng that varies as a function of the power lever position, the at least one upper Ng limit and the at least one lower Ng limit diverging from the idle power lever position to define a progressive transition out of and into the idle operating regime of the turboprop engine;
receiving a target power for the turboprop engine corresponding to a current power lever position, the current power lever position corresponding to forward thrust operation of the propeller of the turboprop engine and being beyond the idle power lever position;
selecting, from the power governing schedule, a maximum Ng corresponding to the current power lever position and a minimum Ng corresponding to the current power lever position; and
in response to receiving the target power:
governing output power for the turboprop engine to achieve the target power, governing the output power including determining a requested Ng;
when the requested Ng is between the maximum Ng corresponding to the current power lever position and the minimum Ng corresponding to the current power lever position, using the requested Ng to govern the output power for the turboprop engine;
when the requested Ng is above the maximum Ng corresponding to the current power lever position, using the maximum Ng instead of the requested Ng to govern the output power for the turboprop engine; and
when the requested Ng is below the minimum Ng corresponding to the current power lever position, using the minimum Ng instead of the requested Ng to govern the output power for the turboprop engine.

12. The system of claim 11, wherein the at least one upper Ng limit comprises a first upper Ng limit for flight operation and a second upper Ng limit for ground operation, and wherein the at least one lower Ng limit comprises a first lower Ng limit for flight operation and a second lower Ng limit for ground operation.

13. The system of claim 12, wherein the first upper Ng limit and the first lower Ng limit meet at a common value when the power lever position is at idle.

14. The system of claim 12, wherein the first upper Ng limit and the first lower Ng limit overlap when the power lever position is at idle.

15. The system of claim 12, wherein the second upper Ng limit and the second lower Ng limit meet at a common value along the first lower Ng limit.

16. The system of claim 12, wherein the program instructions are further executable for transitioning between the flight operation and the ground operation based on at least one criteria comprising an on-ground status.

17. The system of claim 16, wherein the at least one criteria comprises the on-ground status and a timer condition.

18. The system of claim 16, wherein the at least one criteria comprises the on-ground status and the power lever position.

19. The system of claim 11, wherein providing the at least one lower Ng limit comprises selecting the minimum Ng to ensure a percentage of take-off power in case of an undetected loss of torque.

20. The method of claim 1, wherein determining the requested Ng is performed by a power governing control loop, and the method includes receiving the requested Ng at a speed governing control loop and determining a fuel flow command to control an actual Ng using the speed governing control loop.

\* \* \* \* \*